United States Patent [19]

Gauthier et al.

[11] Patent Number: 5,423,110

[45] Date of Patent: Jun. 13, 1995

[54] PROCESS FOR THE PREPARATION OF COLLECTORS-ELECTRODES FOR THE THIN FILM CELL, COLLECTORS-ELECTRODES ASSEMBLIES AND CELLS OBTAINED

[75] Inventors: Michel Gauthier, La Prairie; Guy St-Amant, Trois-Rivières West; Guy Vassort, Longueuil, all of Canada

[73] Assignee: Hydro-Quebec, Montreal, Canada

[21] Appl. No.: 945,899

[22] Filed: Sep. 17, 1992

[30] Foreign Application Priority Data

Sep. 17, 1991 [CA] Canada .................. 2051611

[51] Int. Cl.⁶ .................. B23P 13/00; B05D 5/12
[52] U.S. Cl. .................. 29/2; 427/124; 427/404
[58] Field of Search .................. 29/2; 427/124, 404

[56] References Cited

U.S. PATENT DOCUMENTS

| | | | |
|---|---|---|---|
| 4,517,265 | 5/1985 | Belanger et al. | 429/217 |
| 4,748,086 | 5/1988 | Akoh | 427/124 |
| 4,758,483 | 7/1988 | Armand et al. | 429/192 |
| 4,824,746 | 4/1989 | Belanger et al. | 429/218 |
| 4,851,307 | 7/1989 | Armand et al. | 429/192 |
| 4,897,917 | 2/1990 | Gauthier et al. | 29/623.3 |
| 5,197,993 | 3/1993 | Ferrando et al. | 29/2 |
| 5,290,592 | 3/1994 | Izuchi et al. | 427/124 |

FOREIGN PATENT DOCUMENTS 0073555 3/1983 European Pat. Off. .
2637118 3/1990 France .

*Primary Examiner*—David B. Springer
*Attorney, Agent, or Firm*—Oblon, Spivak, McClelland, Maier & Neustadt

[57] ABSTRACT

Metallization by deposit under vacuum of metal on a face of a support film of synthetic resin at a thickness of 0.005 to 0.1 micron, followed by the electrochemical deposit of an additional metallic layer, whose thickness is between 0.1 and 4 microns. A coating of an electrode of a generator is then applied on the surface of the collector thus prepared. The assembly is characterized by the adhesion of its components and its facility of mechanized handling during the steps of assembling the complete generator.

22 Claims, 4 Drawing Sheets

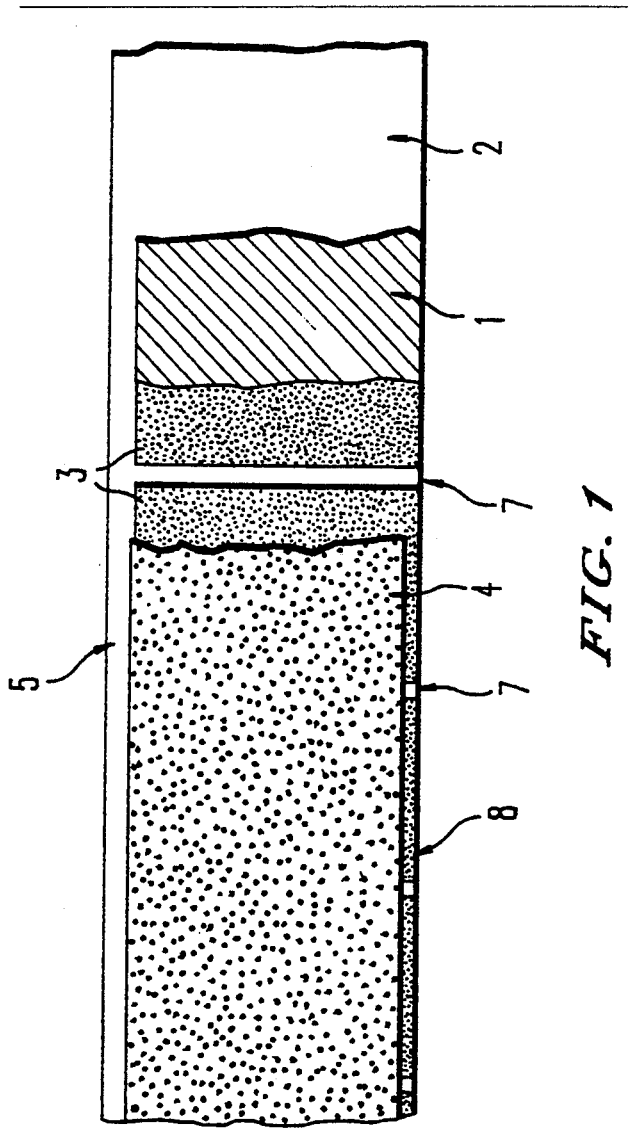
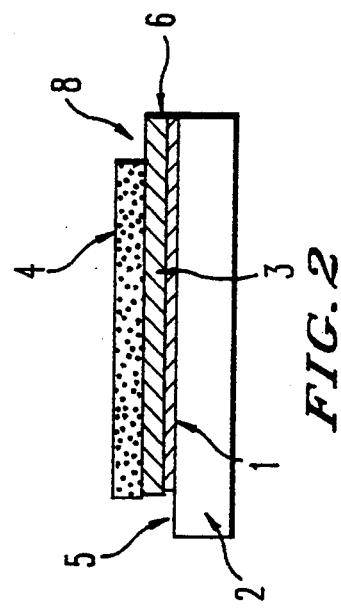

PROCESS FOR THE PREPARATION OF COLLECTORS-ELECTRODES FOR THE THIN FILM CELL, COLLECTORS-ELECTRODES ASSEMBLIES AND CELLS OBTAINED

BACKGROUND OF INVENTION (a) Field of the Invention

The invention concerns a process which is rapid, and economical to produce collector-electrode assemblies consisting of a metallized insulating plastic support on which there is first provided a controlled electrochemical deposit of a metal which is sufficiently conductive, which is thereafter coated with a film of a material of an electrode (anode or cathode) of a thin-film cell. The electrochemically deposited metal is selected for its compatibility with the material of said electrode. This process enables to prepare collector-electrode assemblies which are particularly well adapted for thin film electrochemical cell utilizing polymer electrolytes. The embodiments of the invention enable for example to optimize the characteristics of these collector-electrode assemblies as well as the performances and the designs of the cell. The main advantages of the processes and devices of the invention concern particularly the optimization of the thickness and of the conductivity of the conductive coating, the ease of handling in machines, of the assemblies supported on plastic film and the choice of certain designs which are particularly advantageous for the use of thin film cell. These advantageous designs are made possible, for example, because of the control of the surfaces and the shapes of the conductive coatings on which the materials of the electrode are applied.

(b) Description of Prior Art

A collector is defined as presenting an additional metal which is applied on the electrode to drain the electrons from the cell without an appreciable ohmic drop.

The recent development of polymer electrolyte batteries, for example those based on lithium, present substantial possible advantages on the point of view of electrochemical performances and techniques of application. These cell, which are entirely in solid state, enable in principle a substantial range of application which include electronic micro-cell up to the large generators intended for electrical vehicles. However, important technological difficulties must be overcome in order to be able to optimize the performances and to develop economical processes of manufacture of this new type of cell.

The polymer electrolytes are, indeed, not very conductive with respect to the organic liquid electrolytes presently used for primary or rechargeable lithium cell. The consequence is that electrochemical cells must be prepared from very thin films (total thickness of 5 to 200 microns). Important film surfaces should therefore be used to compensate for the low conductivity of the polymers and to give the desired powers and energies during storage.

In previous works, the Applicant has shown how to prepare a cell and its electrochemical components in the form of thin films (U.S. Pat. Nos. 4,517,265; 4,851,307; 4,758,483; 4,824,746; French Patent 87 08539 and U.S. Pat. No. 4,897,917). However, when the thickness of the active electrochemical components of the cell is reduced (anode, electrolyte and cathode), it is important to reduce, in the same proportion, the passive Components (collectors and electric insulating materials). Otherwise, what will be gained, in power or in electrochemical performance, by increasing the surface of the cell will be compromised by the loss of massic or volumic energy content, as a result of the proportion taken by the passive components. Moreover, if the Applicant has shown how the components of the cell may be prepared rapidly and at low cost, it is not the same with the collectors (and to a lesser degree of the insulating materials) presently available, of which the cost become too high when the required thicknesses are of the order of 10 microns to a few tenths of micron.

Among the processes presently available to manufacture thin collectors of the order of a few microns, lamination is more current. However, few metals are sufficiently malleable to be laminated at these thicknesses (Au, Sn, Al for example) and, generally, the costs increase rapidly for thicknesses below 50 to 5 microns, by virtue of the number of passes required for lamination, losses of materials, as well as the problems of hardenings and contamination by lubricants. Moreover, the commercially available thicknesses (12 microns for stainless steel, 6–7 microns for aluminum) are still too elevated and penalizing in terms of cost, material and dead weight or volume, for most of the applications intended for polymer electrolyte batteries.

Electro-forming is a technique of plating where the free and self-supported metallic film is obtained by electrochemical deposit, from an electrolytic solution, on an electronic conductive mandrel. The costs of the manufactured products stand at about US$ 1/pi$^2$ and the minimum thicknesses which are available are 6 microns nickel and 10 microns for copper. This technique is applicable to certain materials only and, the necessity to peel and handle a free film after the deposit requires certain materials only and, the necessity to peel and handle a free film after the deposit requires minimum thicknesses otherwise all mechanical behavior is lost. These films are currently used as weldable conductive sheets in the manufacture of printed circuits.

Table I illustrates the importance that the weight and thickness of the current collectors may take for thin film polymer electrolyte cell. A comparison is made, by way of example, on the basis of a battery of type AA in which the useful volume is fixed at 6.6 cm$^3$. The battery is made of the following elements in the form of films co-wound into a spiral: Li/electrolyte polymer/TiS$_2$/collector (Al or Ni)/polypropylene insulating film (PP) as illustrated in FIG. 3. This table is based on passive components (collector insulating films) selected from products which are presently available in the trade (Al 12$\mu$, Ni 7$\mu$, PP 5$\mu$) and on two formulations of polymer electrolyte batteries which are typical in the technology which is presently developed, wherein the total thickness of the electrochemical components, Li/polymer electrolyte/TiS$_2$ is respectively fixed at 56 and 180$\mu$.

TABLE 1

| Thicknesses of electrochemical components Li/polymer electrolyte/TiS$_2$ | | | |
|---|---|---|---|
| 56 microns total | | 180 microns total | |
| Thicknesses of passive components | | | |
| Al 12$\mu$/ PP 5$\mu$ | Ni 7$\mu$/ PP 5$\mu$ | Al 12$\mu$/ PP 5$\mu$ | Ni 7$\mu$/ PP 5$\mu$ |

| | Al 12$\mu$/ PP 5$\mu$ | Ni 7$\mu$/ PP 5$\mu$ | Al 12$\mu$/ PP 5$\mu$ | Ni 7$\mu$/ PP 5$\mu$ |
|---|---|---|---|---|
| Wh/l | 220 | 236 | 260 | 267 |
| Wh/Kg | 140 | 111 | 160 | 160 |

It will be noted that in this table, the passive components (collectors/insulating materials) presently available become very penalizing for the electrochemical characteristics of a cell (Wh/l, Wh/Kg) with polymer electrolyte and the latter is prepared in thin form, i.e. when the total thickness of the active chemical components decreases. These penalties result from the excess of volume and weight of the conductive metal present therein. These values are given to assist in characterizing the prior art only; the thicknesses of 56 to 180 microns are selected arbitrarily. For batteries thicknesses lower than these values, still more important penalties are to be expected. Moreover, by way of illustration, the cost of an electro-formed sheet of nickel, 1 $/pi$^2$, used in the cells of table I would represent by itself only from $0.40 to $1.10 per battery AA. Such a cost is unacceptable commercially for this type of readily available battery. The cost of aluminum under these conditions is less, but this metal is penalizing on the point of view of volumic energy and limits the designs of the proposed cell because it is unstable in the presence of lithium and its alloys.

It is known, on the other hand, that these metallized dielectric plastic films may be used as electrodes in electrostatic condensers, see for example, European Patent No. 0 073 555 and French Patent No. 2,637,118. The metals generally deposited on plastic are in this case aluminum, zinc and their alloys. These metallizations are generally obtained, under vacuum, by thermic evaporation or by other assisted processes of evaporation: cathodic projection or electron beam. The thickness thus obtained are however very low, typically 100–500 Å and the surface resistances are consequently very high, 1–100 Ω/square. In addition to the fact that the metals which are known and deposited are not chemically stable with the anode of polymer electrolyte cell, the surface conductivities thus obtained are not sufficient to permit the draining of the ranges of currents provided for the cell of average or large sizes. The processes of metallization under vacuum are known to be limited to thicknesses lower than about 1000 Å(0.1μ). At these thicknesses, the process of metallization becomes slow and costly and the deposits obtained are of less quality. These electrodes of electrostatic condensers are therefore not applicable as collector in most of the polymer electrolyte lithium cell, except possibly in the case of the metallization of aluminum applied to a positive electrode in low size batteries, operating at 25° C. and where the mean current densities are low and the lateral distances to be collected are low (see equation 1, hereinafter).

There is therefore a range of critical thicknesses located between 5 and 0,1 microns for which, presently, there is practically no adequate collectors for the technology of polymer electrolyte lithium batteries. The present invention concerns current collectors in which the possible range of thicknesses corresponds to this specific need.

SUMMARY OF INVENTION

The invention consists in a process for the rapid manufacture of assemblies consisting of, a metallic collector obtained by electrochemical metallization-plating supported on an insulating plastic film and a coating of a material of an electrode of a cell comprising the following main steps:

rapid metallization under vacuum, particularly favorable to the electrochemical deposit of a second metal, on at least one part of the surface of at least one of the faces of the insulating support films, rapid electrochemical deposit of a second metal on the metallized conductive surface, so as to optimize the surface resistance of the collector, application of an adherent coating, consisting of one of the electrodes of the cell on at least one part of the surface of the supported collector.

More specifically, the invention concerns a process for the preparation of collector-electrode assembly, with lateral collection, easy to handle and intended for a polymer electrolyte electrochemical cell utilizing electrodes operating through alkali or alkali-earth ions, comprising the following steps:

metallization by deposit under vacuum, of at least one metal, on at least one face of an insulating support film of synthetic resin, the metal for the metallization being selected so as to constitute a substrate promoting an electrochemical deposit and its thickness being adjusted between about 0.005 and 0.1 micron in order to give a metallized film having a sufficient electronic conductivity to initiate a uniform electrochemical deposit;

electrochemical deposit, of at least one additional metallic layer, of a total thickness between 0.1 and 4 microns, on at least one part of the surface of the metallized film so as to constitute a metallized-plated conductor and to reduce the electrical surface resistance of the collector at a level sufficient to prevent significant voltage losses by resistive effect in the collector during operation of the generator, the metal of the additional metallic layer deposited being selected for its compatibility with the corresponding electrode of the generator;

application of a coating of an electrode of the generator on at least one part of the surface of the supported collector thus constituted so as to ensure the adhesion of the electrode to the supported collector film;

the assembly thus produced being characterized by the adhesion of its components and by an ease of mechanized handling during steps of mounting of the whole generator.

The metallization by deposit under vacuum as well as the electrochemical deposit may be carried out continuously.

The process of metallization under vacuum is selected among simple or assisted processes of thermochemical vaporization, for example by cathodic polarization or electron beam.

Preferably, the insulating support film is a synthetic resin selected for its compatibility with the environment of a generator including electrodes operating through alkali or alkali-earth ions and whose thickness varies between 1 and 30 microns. The synthetic resin is for example based on polypropylene, polyester, polysulfone or polypropylene, preferably polypropylene or polyethylene. The metallization is normally carried out with elements which are compatible with the electrochemical deposit, selected from, copper, nickel, iron, molybdenum, chromium, carbon, zinc, silver, gold or alloys thereof, and the surface resistance of said elements selected for example between 0.1 and 10 Ω/square. The metallized element is preferably a metal selected from copper, gold or silver or alloys thereof. The electrochemically deposited metal is preferably nickel, iron, chromium, molybdenum or alloys thereof. The metallized film covered with a metallic electrochemical deposit may cover only partially the surface of the insulating support film so as to leave a non-conductive lateral margin representing less than 10% of the width of the insulating support film. This partial covering of the insulating film with a conductive metallized-plated coating may be obtained by processes selected among the utilization of lateral masks during the metallization, or by means of processes based on the removal of the metallized or metallized-plated conductive coating, for example by laser machining, flashing, chemical or mechanical means.

The metallized-plated conductive coating may be periodically interrupted in transverse direction of the film by means of non-conductive bands, which may be obtained by local removal of the metallized or metallized-plated conductive layers before the step of application of a coating of an electrode, by means of laser processes, flashing or by chemical or mechanical mean.

The material of the electrode applied on the supported collector is preferably lithium or a lithium based anode. This application of the coating of lithium may be carried out by processes of lamination or pressing of a film of lithium or by projection or wetting with molten lithium. The material of the electrode applied on the supported collector is preferably a cathode or a composite anode bound by the polymer electrolyte of the cell. The application of the coating of the cathode or the composite anode may also be obtained by processes of spreading in the form of solution or molten product or also by means of a process of transfer of an adhesive film of a cathode or anode already prepared. The electrode coating, preferably, covers incompletely the lateral non-conductive margin of-the insulating support film. The electrode coating may also be applied so as to incompletely cover the surface of the metallized-plated collector in order to define a lateral conductive margin enabling the application of a lateral electrical contact at the edge of the metallization-plating rather than on the coating of the material of the electrode itself.

According to an alternate embodiment of the invention, the metallized conductor is transversely interrupted by means of non-conductive sections obtained by a local demetallization of the metallized band before the step of electrochemical deposit, the demetallization being obtained by removal of a metallized deposit. It is also possible to treat the total conductive coating by transversely interrupting it by means of non-conductive sections obtained by a removal of the metallic deposits before the step of application of the coating of the electrode, the demetallization being obtained by removal of the metallic deposits by laser machining, flashing, mechanical or chemical means.

The invention also concerns a collector-electrode assembly, with lateral collection, adapted to polymer electrolyte thin film electrochemical cell and their modes of assembly, comprising the following elements:

an insulating support film of synthetic resin, of a thickness between 1 and 30 microns comprising a metallized deposit obtained by depositing under vacuum, on at least one face of the support and on at least part of its surface, in which the metallized thickness varies between 0,005 and 0.1 micron and is characterized by a surface resistance lower than 10 $\Omega$/square;

an electrochemical deposit of at least one metal, whose total thickness is between 0.1 and 4 microns, on all or a part of the thus metallized surface whose electrical surface resistance is lower than 1 $\Omega$/square, characterized in that the last metal deposited is selected for its compatibility with the corresponding electrode of the cell;

coating of a material of an electrode which is adhesive with respect to the collector and the support film consisting of an anode or a cathode of the cell whose thickness is between 1 and 200 microns.

The metallized film preferably includes a lateral non-conductive margin, representing less than 10% of the width of the support, on an edge which is opposite the edge used to establish an outlet contact of the metallized film. The plated metallized conductive coating may be interrupted periodically in a transverse direction of the film by means of non-conductive bands.

According to a preferred embodiment, the electrode does not cover the non-conductive lateral margin of the film. On the other hand, the metallized film which is covered with an electrochemical deposit may include a lateral conductive margin enabling the application of an indirect lateral contact on the metallized-plated deposit rather than on the coating of the material of the electrode itself. The coating of a material of an electrode may be transversely interrupted by means of sections which are not locally covered at the level of the non-conductive sections of the conductive coating.

According to another preferred embodiment of the invention, the insulating support may be covered on each face thereof with a conductive coating and a coating of an electrode of the same nature, both being superposed in identical manner on each face so as to constitute a single biface central collector-electrode assembly when a conductive metal, such as zinc is applied on the lateral conductive parts of the two supported collector-electrode assemblies.

According to another embodiment, the invention concerns a collector-electrode consisting of a pair of collectors-electrodes supported on a same insulating support film including on one face thereof a collector-anode assembly and on the other face a collector-cathode assembly both disposed so that their non-conductive margins be opposite each edge of the support film and so as to possibly enable a lateral electrical contact of the assemblies at their lateral conductive ends.

The invention also concerns a polymer electrolyte lithium cell including at least one collector-electrode assembly described above and assembled as a stacking or as flat or cylindrical windings.

According to another embodiment, the invention concerns a polymer electrolyte generator in the form of an adherent assembly of consecutive thin films characterized in that the two external faces of said cell correspond to the insulating supports of collector-anode and collector-cathode assemblies such as described above, these assemblies being placed so that the lateral contacts may be at the opposite lateral ends of the cell. The latter is produced and stored in the form of temporary windings and handled without risk of short-circuit, the two external faces being constituted of insulated films. The external electrical contacts consist of metal added at the lateral ends of the assembly once the latter is wound or stacked in its final form. The cell may include on the conductive side of the collector-electrode assembly, a metal of addition, for example zinc or its alloys applied by pulverization or in the form of conductive paste.

According to another alternative embodiment, the invention concerns a polymer electrolyte lithium cell including at least one collector-electrode assembly as described above prepared by folding in zig-zag the whole of the films of the cell so that the transverse non-conductive zones of the collector coincide with the zones of foldings in order to improve the reliability and the performances of the cell.

The invention has many important characteristics:

It uses the rapid metallization under vacuum of an insulating support film to fix the surfaces which will become conductive and to facilitate an ulterior electrochemical deposit.

The electrochemical plating carried out on the metallization enables to optimize the resistivity and the state of surface of the collector and to select a metal which is compatible with the coating of the corresponding electrode.

The step of electrochemical deposit is facilitated by the nature and the purity of the metallized deposit; moreover, the electrochemically plated surface may be controlled by modifying the final surface of the metallization, or of the final electrochemical deposit by removal of a portion of the conductive surface, for example, by removal with a laser beam. Since the electrodeposited film remains supported on the insulating film, its thickness may be considerably reduced. This enables to increase the speed of the process of depositing well beyond speeds reached by the conventional processes of electro-forming free sheets.

The presence of an insulating plastic support, which is compatible with the whole of the cell, facilitates the handling of the collector and of the collector-electrode assembly. This insulating support may be selected so as to ensure the adhesion of the metallic coating and to facilitate the preparation of collector-electrode assemblies and the ulterior steps of assembling the complete cell. Finally, the plastic support of these assemblies is thus used as electrical insulating material in certain designs of cell.

The steps of metallization and plating on an insulating film therefore enable to optimize the density of energy by eliminating the excess of weight and volume of the passive components (collectors and insulating materials) of the cell and to also reduce the costs materials of the processes used.

The current collectors of the present invention are intended to be used for assemblings by winding or stacking films, and utilize, preferably, collectors with insulating and conductive lateral margins, so as to be able to apply metallic contacts at the ends of the assemblies.

The possibility of easily and continuously controlling the shapes and the surfaces of the conductive films of the insulating support films enables to easily produce collector-electrode assemblies as well as assemblies of cell, which are permanent or temporary, with particularly good performance and which are reliable insofar as electrochemical performances.

It is an object of the invention to provide collector-electrode assemblies in which the current collector is optimized depending on the specific needs of the corresponding electrode and of the polymer electrolyte cell, for example with respect to the control of the excess of conductive metals used as collectors, the nature of the metals in contact with the electrodes, the control of the metallized surfaces and the films of electrodes supported on an insulating thin film which facilitates the handling of the collector-electrode assembly and the assembling of the cell.

BRIEF DESCRIPTION OF DRAWINGS

The invention will be better understood and other advantages will appear by means of the description which follows of preferred embodiments and the following drawings, in which:

FIG. 1 is a view from above-of a collector-electrode assembly which is typical of the invention;

FIG. 2 is a cross-section view of the same assembly;

FIGS. 1 and 2 illustrate views from above and in cross-section of a typical collector-electrode assembly according to the invention. These figures and the following do not respect the true proportion of the elements, in order to facilitate understanding. The assembly consists of an insulating plastic support film 2 covered on at least one face and on at least a portion of its surface with a metallic film 1, obtained by metallization under vacuum, selected for facilitating an ulterior step of electrochemical plating and having a surface conductivity which is sufficient to initiate the plating. The thickness of this metallized film is generally of the order of a few hundreds of Amstrongs.

Figure 3:
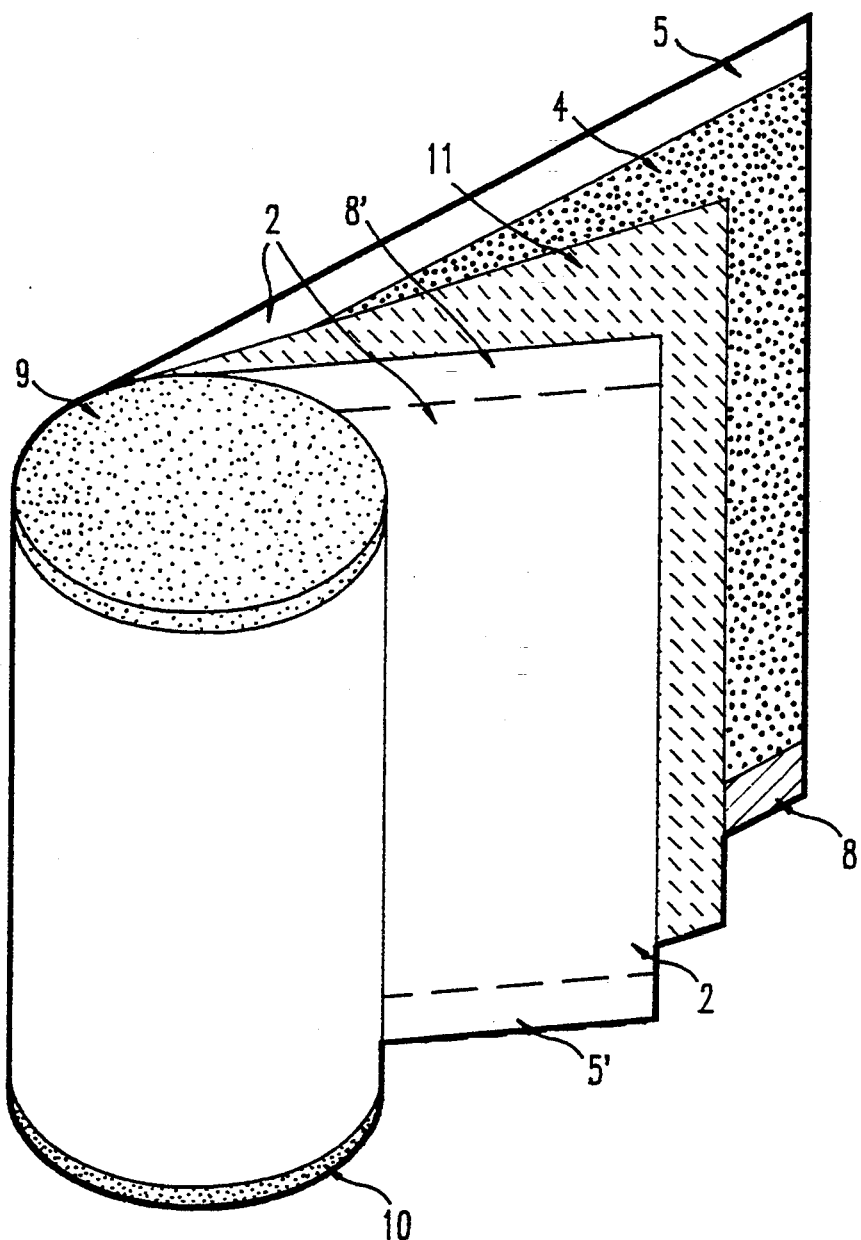
FIG. 3 is a perspective view of a cell in the form of cylindrical winding including two collector-electrode assemblies according to the invention as well as an electrode film.

This metallization is thereafter covered with an electrochemical deposit of at least one metal of which the last one is selected for its compatibility with the material of the corresponding electrode. The thickness of this electro-deposit 3 is generally between 0.1 and 4 microns and is adjusted so as to permit the lateral collection of the electrons of the electrode of the cell. In principle, the thickness is adjusted so that the surface resistivity expressed in $\Omega$/square is sufficiently low to prevent an appreciable drop of the voltage of the cell in operation at maximum current densities in normal utilization, $I_{max}$/cm$^2$. The following equation 1 relates the main parameters which guide the choice of the optimum surface resistance of a collector with lateral connection.

$$\Delta V = (I/cm^2)\,(\Omega/\Box)\,L^2/2 \qquad (1)$$

where, $\Delta V$ is the admissible voltage drop for the collector film, $I/cm^2$ is the maximum current density in normal use, $\Omega$/square is the surface resistance of the current collector and L is the depth of electrode to be drained, for example, the width in centimeters of the collector film. The admissible voltage drop may vary depending on the type of application under consideration, however, in the majority of cases, this ohmic drop should remain lower than a few percentages of the voltage of the cell. Even if this equation may serve to optimize the collectors of the invention, it goes without saying, for one skilled in the art, that other parameters may be considered in the choice of the thicknesses of the films deposited. This is the case for example of parameters of heat control of the cell which may bring about an increase of the thickness of the collectors, or still, a fine optimization of the resistivity of the collectors to take into account the increase of currents to be drained when the end of the collector where lateral collection is carried out, is drawn nearer. The invention enables to adjust the characteristics of the collector assemblies to these various needs.

By way of example, table 2 illustrates the gain which results from the utilization of the collectors of the invention under conditions which are equivalent to those described in table 1 for a battery of type AA. In this case, the passive components of the cell are: the support film PP 5μ, a metallization of about 400 Å of copper and a deposit of nickel of 1 micron.

TABLE 2

| | Thicknesses of electrochemical components Li/polymer electrolyte/TiS$_2$ | |
|---|---|---|
| | 56 microns total | 180 microns total |
| | Thicknesses of passive components PP 5μ + 1μ (metallisation + plating) | |
| Wh/l | 256 | 276 |
| Wh/Kg | 192 | 201 |

It is noted, by comparison with table 1, that there is an important gain resulting from the collectors of the invention when used with cell Li/TiS$_2$, more particularly when the thickness of the electrochemical components of the cell is 56 microns. Again with the same example, the projected costs for the support collectors of the invention is estimated at a few cents at the most, on the basis of the actual cost of the metallized plastic films and by taking into account the expected speed for the step of electrochemical deposit.

The characteristic steps of the process of the invention are the following:
1. metallization 1 under vacuum of at least one part of the surface of the insulating film support 2 so as to permit an ulterior electrochemical deposit;
2. the electrochemical deposit 3 (plating) of at least one conductive metal of which the last one is selected for its compatibility with the corresponding electrode;
3. the removal of a portion of the conductive surface to control the shape of the conductive surface supported by the insulating film 2;
4. the application of an adhesive coating of a material of an electrode 4 on the supported collector so as to cover at least a portion of the conductive surface.

Theses steps are preferably carried out continuously, however, according to the manner of production used for assembling complete cell, these steps may be carried out separately and at different times. The order of steps 2 and 3 may be reversed to optimize certain embodiments of the process and in certain cases the step of removal of a portion of the conductive surface is not required.

Preferred embodiments of the invention are illustrated in FIGS. 1 to 6. An advantageous variant of the invention consists, for example, in providing, during the steps of metallization-plating a non-conductive lateral margin 5 and a conductive lateral margin 8 extending to the opposite end of the collector-electrode assembly, so as to facilitate electrical contacts 9 and 10 at the lateral ends of the flat or wound assemblies. This design, illustrated in FIG. 3, in the case of a cell in a cylindrical wound form including two collector-electrode assemblies and an electrolyte film 11 schematically illustrated 8' and 5' represents the position of the conductive and insulating margins of the second collector-electrode assembly seen from the rear. This type of design is easy to utilize starting from the processes of the invention and enables to largely simplify the procedures of assembling and providing contacts for the cell. The non-conductive margins may be made in different manners either by techniques of local masking during metallization, or also by techniques of removal of the metallized surface or of the metallized-plated surface, such as by the techniques of laser beams, flashing, abrasion, or localized chemical treatment. For this embodiment, the coatings of electrodes are prepared so as not to completely cover the non-conductive lateral margin 5 and 5' as well as a portion of the conductive margins 8 and 8' so as to permit, in this latter case, a direct contact between the metal of the lateral contact 9, (e.g. a deposit of Zn obtained by shooping), and the metallized-plated surface 1, 3.

Figure 4:
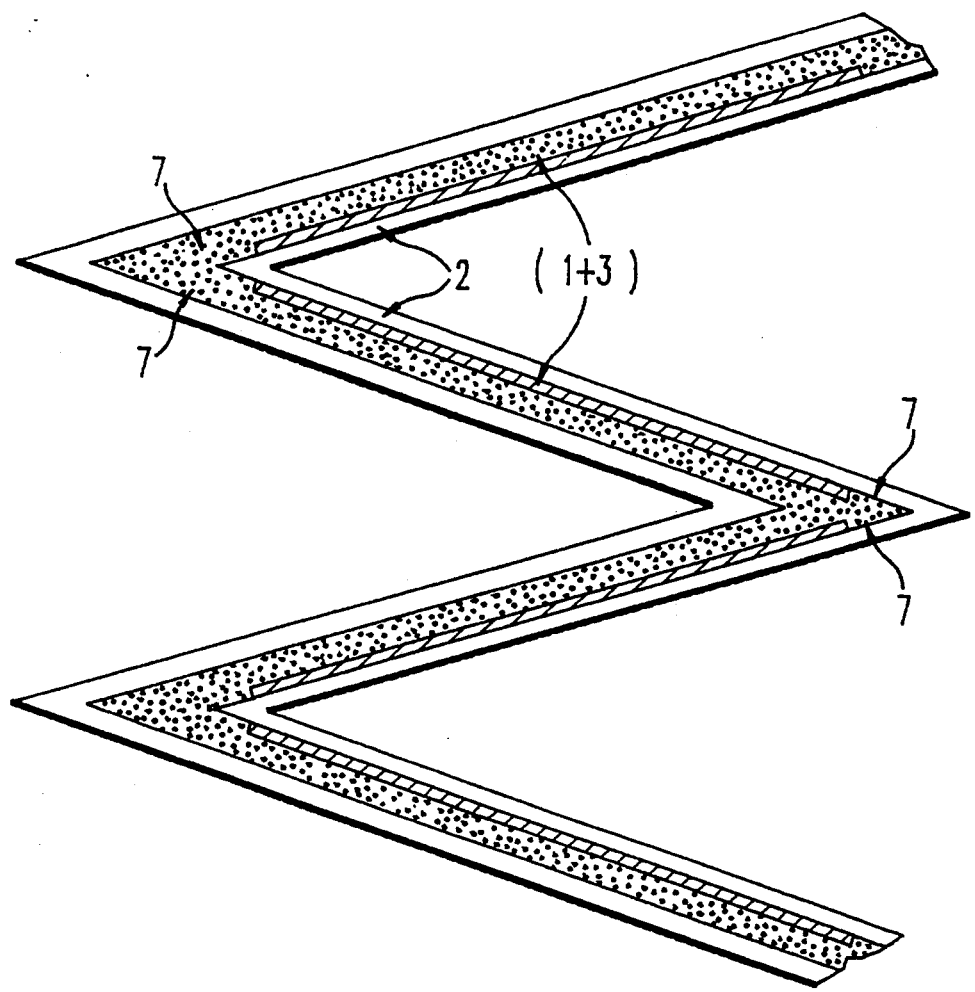
FIG. 4 is a schematic illustration of a collector-cathode assembly mounted in zig-zag.

One way to prepare a specific collector-cathode assembly is schematically illustrated in FIG. 4 for the case of a mounting in zig-zag. In this assembly, the conductive surface of the collector is transversely divided by means of non-conductive sections 7, also illustrated in FIG. 1, obtained by local removal of the metallic conductive coating before the application of the coating of the electrode consisting of a composite cathode. The removal of the metallic conductor under the coating of the composite cathode locally reduces the electrochemical activity (density of current) and enables to benefit from these transverse sections to fold the electrochemical assembly Li/polymer electrolyte/cathode-collector when assembling in zig-zag or flat windings, without the risk of having weak points which are detrimental to the properties of cycling or to the reliability of the cell.

Figure 5:
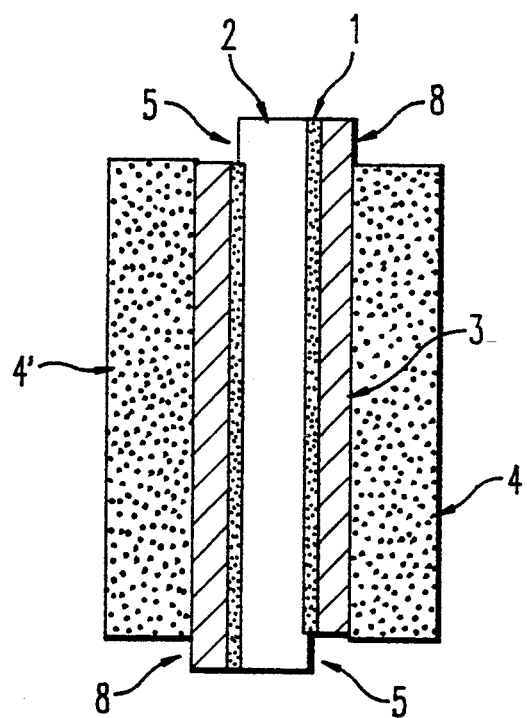
FIG. 5 illustrates two collector-electrode assemblies according to the invention mounted on the two faces of a same support film.
Figure 6:
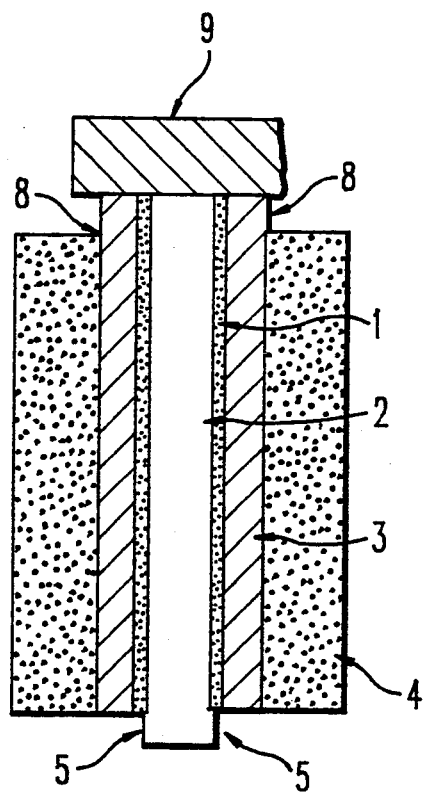
FIG. 6 is a view similar to FIG. 5, where the two collectors are placed symmetrically on both sides of the support film.

Two other modes of utilization which are particularly interesting for the collector-electrode assemblies according to the invention adapted to polymer electrolyte cell are described briefly in FIGS. 5 and 6. In these cases, the two faces of the insulating support are treated according to the processes described to produce two distinct collector-electrode assemblies, one on each faces of the support film. In the first case illustrated in FIG. 5, the insulated film 2 is covered on its two faces with a collector 1, 3 whose non-conductive margins 5 are placed opposite each face of the support. In this particular case, the coatings of electrodes applied are of different natures (anode and cathode) and it goes without saying that the metallic deposits are selected accordingly. This design is particularly advantageous to simplify certain types of assemblies such as the small cylindrical or flat windings and in order to optimize the energy densities stored by the reduction of the proportion taken by the passive components of the cell.

In the second case, illustrated in FIG. 6, the two collectors are placed symmetrically on both sides of the insulating film support so as to constitute a single biface collector when a conductive deposit 9 (i.e. Zn) will be applied on the lateral end of the collector-electrode assembly. This type of embodiment is particularly advantageous when the coating of electrode applied is a thin film of lithium. In this case, the lithium collector-electrode assembly will be much more easy to handle than a simple film of lithium of equivalent thickness. Moreover, if the coating of lithium does not cover all the conductive lateral margin 8, it is then possible to provide a contact between the conductive surface and the collection metal applied at the lateral end such as zinc, without direct contact between the latter and the reactive lithium.

The following examples illustrate various preferred embodiments, and are given without limitation. Certain steps of metallization-plating described in these examples are detailed in two other patent applications filed simultaneously under numbers . . . and . . . The compositions of the electrodes, the polymer electrolytes as well as their processes of preparation are described in the previous patent applications mentioned above.

EXAMPLE 1

This example describes a practical embodiment, in three steps, of a collector-electrode assembly for a polymer electrolyte cell also illustrated very generally in FIG. 1.

Step 1 consists in continuously metallizing a film of polypropylene 23 micron thick and 10 cm wide previously treated by corona discharge. Copper is metallized by thermic evaporation under vacuum. The metal is selected for its good conductivity and because it constitutes a substrate of choice for the later step of plating. The thickness of the metallization obtained is uniform and is about 500 Å and its resistance is 0.5 Ω/square.

Step 2 consists in continuously electrochemically plating the metallized copper surface with nickel. The electrochemical deposit is carried out from a known solution of nickel sulfamate in a bath at 40° C.

The electrochemical plating of nickel films of which the thicknesses vary between 0.3 and 3 microns is verified. The aspect of the deposits of nickel obtained is shiny for thicknesses lower than 0.8 micron and has a mat finish, which characterizes normal sulfamate baths when the thicknesses are of the order of a few microns. A film containing a nickel deposit of 0.3 micron is produced in this manner at a current density of 0.08 Ampere/cm$^2$ and at a plating speed of about 2 m/min. The film thus obtained adheres to its support and the assembly PP/Cu/Ni may be folded many times without damage on a radius of 2 mm. Adhesion between copper and the plastic film is therefor sufficient for the needs of the process, however, the latter could still, if required, be improved considerably by using other support films which are more polar, such as polyester. The surface resistance measured for this film is lower than 0.1 Ω/square. These values do not correspond, of course, to an optimization of the process, however, they illustrate the interest of an electrochemical plating carried out on a metallized deposit under vacuum bearing in mind the chemical cleanliness of the latter (non-oxidized copper surface and absence of contaminants).

The third step consists in applying an electrode coating on the surface of the nickel supported on the insulating material. In this example, a composite cathode based on TiS$_2$, acetylene black and linear polyether mainly based on ethylene oxide is prepared from a solution of acetonitrile and dried thereafter to remove the solvent. In this manner an adherent coating whose electrochemical capacity of 1.5C/cm$^2$ is obtained to give a collector-electrode assembly which is easy to handle during ulterior steps of assembling of the cell.

EXAMPLE 2

This example is similar to example 1, in which after the step of metallization, a demetallization is carried out by mechanical removal so as to control the plating surface of step 2. Removal consists in withdrawing, by scratching, the copper metallization on transverse sections 0.5 cm wide so as to separate the conductive band into independents bands. This mode of removal has been selected for its simplicity of use in laboratory. The electrochemical plating is thereafter carried out so as to give a 0.3 micron nickel deposit. It is noted that the plating is carried out solely on a copper containing surface. Step 3 of applying a coating of electrode TiS$_2$ leads in this case, to a continuous film which adheres to the conductive surfaces as well as to non-conductive transverse bands 7 of FIG. 1. This example illustrates the possibility of locally removing the electronic collector under the electrode coating so as to provide non-conductive sections 7 to substantially reduce the electrochemical activity in certain sections of the supported collector-electrode assemblies. This possibility largely facilitates the production of assembled cell and improves the reliability thereof when operations of folding of the polymer electrolyte battery are required, for example in assemblies in zig-zag of FIG. 4. This collector-electrode assembly will be used for example 7.

EXAMPLE 3

This example illustrates a preferred way of realizing the step of demetallization of a portion of the conductive surface of a supported collector. We are concerned, in fact, with an alternative to the mechanical removal described in example 2. The technique used is based on a removal by laser beam; the following conditions are used: CO$_2$ laser, pulses of 200 nanoseconds, wavelength 10.6$\mu$ and demetallized punctual surface of 3 to 10 mm$^2$. Two types of tests were carried out, one with laser demetallization of the film of Polypropylene metallized with copper (500 Å) of example 1 and the other, with the metallized (Cu) and plated (Ni, 0.3$\mu$) polypropylene film also prepared according to example 1. In both cases, it has been established that the metallic coating may be rapidly removed by laser without affecting the polypropylene support. The demarcation of the demetallized surface is excellent ($\pm$1 micron). The interest of this example is to confirm the possibility of rapidly demetallizing by laser beam immediately after the step of metallization or also, when the plated deposits are not too thick, after the step of electrochemical deposit. This technique of demetallization therefore enables to easily obtain the shapes of the collectors illustrated in FIGS. 1 and 4.

EXAMPLE 4

This example shows the operation in a battery of the collectors of the invention in the case of the collector-cathode assembly produced in example 1. The assembly PP/Cu/Ni/composite electrode TiS$_2$ is used for mounting a complete cell. The latter is prepared by consecutive transfers, at 75° C, of a film of electrolyte 20 microns thick and a film of lithium 15$\mu$ laminated on nickel 7$\mu$. The electrolyte is a polyether of ethylene oxide containing a salt of lithium (CF$_3$SO$_2$)$_2$NLi in the ratio 18/1. The surface of the cell is 4 cm$^2$. This cell is thereafter cycled at 60° C., to accelerate the phenomenons of aging after more than 100 cycles of discharge/charge, at 300 and 200 $\mu$A/cm$^2$ and limits of voltage of 2.9 and 1.4 V. No difference of behavior is observed in terms of rate of utilization of the materials of the electrodes, 85% at cycle 2 versus 70% at cycle 100 or in terms of internal resistance of the battery in comparison with an identical battery in which the cathode is prepared on an electro-formed sheet of nickel 7 microns thick. This example shows the electrochemical and chemical compatibility of the passive components (PP, Cu, Ni) of this collector-electrode assembly prepared according to the invention and the possibility to reduce to a micron and less the thickness of the metals used as lateral collectors so as to optimize the energy contents of polymer electrolyte cell according to the hypothesis of the preceding table 2.

EXAMPLE 5

This example shows the operation in a battery of the collector-electrode assemblies of the invention when the collectors associated to a lithium electrode 20 microns applied by lamination. The assembly is prepared by cold laminating a film of lithium on the collector prepared in example 1: PP/Cu,500 Å/Ni, 0.3μ. A portion of the supported conductive surface is left uncovered with lithium so as to enable a lateral contact directly on the conductive surface.

Two batteries are prepared from this collector/lithium anode assembly. One including a $TiS_2$, 1.5 $C/cm^2m$ is cycled at 25° C. on more than 50 cycles at discharge/charge currents of 80 and 60 μA; the other, including a vanadium oxide based cathode, 4.0 $C/cm^2$, is cycled at 60° C. on more than 100 cycles at discharge/charge currents of 300 and 200 $\mu A/cm^2$. In both cases, no loss of electrical contact was observed between the lithium of the electrode and the supported collector and the performances obtained, in power, rate of utilization and internal resistance, correspond to those of batteries utilizing free lithium or lithium laminated on a support of nickel 7μ. When taking it apart, after cycling, a visual observation of the collector shows no difference between the initial deposit of plated nickel and that which has only been in contact with the lithium of the cell 1. This example illustrates the compatibility of the collectors of the invention in the case of PP/Cu/Ni and lithium. This case is very interesting for the preparation of electrode-collector assembly enabling the handling of lithium, the support of the collector then serving as mechanical support for the monoface assembly (PP/Cu/Ni/Li) for biface assembly Li/Ni/Cu/PP/Cu/Ni/Li). Moreover, these collectors and their collector-electrode assembly are particularly well adapted to solve the major problem of lateral collection of lithium by shooping with usual metals such as zinc. As illustrated in FIGS. 5 and 6, the zinc deposit may be carried out on the conductive margin rather than directly on the coating of lithium. The case of the biface assembly is particularly interesting on the point of view of cycling of lithium, since we have observed that the free lithium used electrochemically on its two faces leads to efficiencies of redeposit which are lower than the performances of a film of nickel of half-thickness supported on nickel. It is therefore advantageous to use the biface assembly with a thin conductor PP support, such as, 4 microns, instead of a film of free lithium of equivalent thickness which was used on the two faces.

EXAMPLE 6

This example is similar in all respects to example 4, except with respect to the nature of the insulating film utilized, process of metallization of copper and the cycling temperature. In this case, the polypropylene film is replaced by a polyester film (Mylar*); the film is thereafter metallized under vacuum by cathodic pulverization of copper. The maintenance of the rates of utilization of the materials of the electrode during cycling at 25° C., 80% utilization after more than 50 cycles show the possibility of utilizing insulating plastic supports which are less inert than PP but more favorable to adhesion, because of the protection afforded by the film of electrodeposited nickel. These films may therefore in certain cases be used * Trade mark in the chemical environment of a lithium cell, if a direct contact may be prevented between incompatible elements and if neither water nor vapor nor volatile component are released and transferred inside the cell at normal temperatures of utilization.

EXAMPLE 7

This example is realized starting from the collector-cathode assembly of example 2. A rectangular band of about 10 cm long by 3 cm wide is used, and it is cut out from the collector-electrode assembly, in the zone where the electrode coating is applied. The cut out band is selected so as to include two identical conductive areas and a transverse non-conductive section 0.5 cm wide localized in the middle of the rectangular band. A cell is thereafter assembled by transfer at 80° C. of this collector-assembly on a half-battery made of a polymer electrolyte 30 microns thick and a 20 micron lithium film supported on nickel. The surface of the half-battery lithium-electrolyte is left slightly offset with respect to the surface of the collector-electrode assembly so as to permit lateral contact with the surface of the supported collector. The battery is thereafter completely folded in two on itself in the non-conductive transverse zone so as to maintain the propylene support of the positive electrode, outside. This battery is thereafter cycled for more than 50 cycles at 60° C. at 100 $\mu A3\ cm^2$ without evidence of bad at 60° C behavior and recharge, i.e. the ratio charged Coulombs/discharged Coulombs is 1.0. An equivalent battery in which the collector Ni/Cu is preserved in the zone of folding, shows signs of lack of efficiency on recharge, ratio of Coulombs in charge/Coulombs in discharge varying from 1.05 to 1.0 , after about twenty cycles, following localized short-circuits in the zone of folding. This example illustrates the importance of the invention which enables, inter alia, the easy control of the conductive surfaces of the supported collectors and the collector-cathode assemblies as used in FIG. 4.

It is understood that the invention is not restricted to the preferred embodiments given above by way of illustration but without limitation and that its scope is defined solely by the claims which follow.

We claim:
1. Process for the preparation of a collector-electrode assembly for a polymer electrolyte electrochemical cell comprising the following steps:
   metallization by deposit under vacuum, of one metal, on one face of an insulating plastic support film which is about 1 to 30 microns thick, the metal deposited having a thickness adjusted between about 0.005 and 0.1 micron in order to give a metallized film having a sufficient electronic conductivity to initiate a uniform electrochemical deposit said metal being selected from copper, nickel, iron, molybdenum, chromium, carbon, zinc silicon or gold;
   electrochemical deposit, of at least one additional metallic layer, of a total thickness between 0.1 and 4 microns, on the surface of the metallized film, the metal of the additional deposited metallic layer being selected from nickel, iron, chromium, molybdenum and alloys thereof and for its compatibility with the corresponding electrode of the cell;

laminating or forming a film of an anode or cathode of the cell or projecting or wetting molten material of the electrode of the cell on at least a portion of the surface of the supported anode or cathode collector thus constituted so as to cause adhesion of the material of the electrode to the supported collector film.

2. Process according to claim 1, wherein the metallization by deposit under vacuum is carried to continuously.

3. Process according to claim 1, wherein the electrochemical deposit is carried out continuously.

4. Process according to claim 1, wherein the process of metallization under vacuum is selected from the processes of simple or assisted thermochemical vaporization.

5. Process according to claim 4, wherein the metallization under vacuum is carried out by cathodic pulverization or electron beam.

6. Process according to claim 1, wherein he insulating support film is a synthetic resin selected for its compatibility with the environment of a cell including electrodes operating through alkali or alkali-earth ions.

7. Process according to claim 1, wherein the surface resistance of the metallization metals varies between 0.1 and 10 $\Omega$/square.

8. Process according to claim 1, wherein the metallization metal is selected from copper, gold, or silver.

9. Process according to claim 8, wherein the surface resistance of said metal varies between 0.1 and 10 $\Omega$/square.

10. Process according to claim 1, in which the electrochemical deposit covers only partially the surface of the insulating film support.

11. Process according to claim 10, which comprises leaving a non-conductive lateral margin representing less than 10% of the width of the insulating support film.

12. Process according to claim 10, wherein the partial covering of the surface is obtained by processes selected from the utilization of lateral masks during metallization or by processes based on the removal of the electrochemical deposit.

13. Process according to claim 12, wherein the removal of the electrochemical deposit is carried out by laser machining, or flashing.

14. Process according to claim 1, which comprises providing non-conductive bands on said support film by local removal of the electrochemical deposit before applying an electrode on the surface of the supported collector by means of laser processes, or flashing.

15. Process according to claim 1, in which the material of the electrode applied on the supported collector consists of lithium or a lithium based anode.

16. Process according to claim 1, in which the insulating support film is based on polypropylene or polyethylene.

17. Process according to claim 1, in which the material of the electrode applied on the supported collector consists of a cathode or a composite anode bound by the polymer electrolyte of the cell.

18. Process according to claim 17, in which the application of the coating of the cathode or the composite anode is obtained by processes of distribution in the form of solution or melted product or by a process of transfer of an adhesive film of a cathode or an anode already prepared.

19. Process according to claim 15, which comprises incompletely covering the non-conductive lateral margin of the insulating film support.

20. Process according to claim 19, which comprises incompletely covering the surface of the collector in order to define a lateral conductive margin enabling the application of a lateral contact on the edge of the deposited metal rather than on the material of the electrode itself.

21. Process according to claim 1, in which he metallized support film is transversely interrupted by non-conductive sections obtained by a local demetallization of the metallized deposit before the step of electrochemical deposit, said demetallization being obtained by removal of the metallized deposit.

22. Process according to claim 1, in which the demetallization is obtained by removal of the metallized deposit by laser machining, or flashing.

* * * * *

UNITED STATES PATENT AND TRADEMARK OFFICE
CERTIFICATE OF CORRECTION

PATENT NO. : 5,423,110
DATED : June 13, 1995
INVENTOR(S) : Michel GAUTHIER, et al.

It is certified that error appears in the above-indentified patent and that said Letters Patent is hereby corrected as shown below:

On the title page, Item [54], and Column 1, Lines 2-5, the title should read:

--PROCESS FOR THE PREPARATION OF COLLECTORS-ELECTRODES FOR THIN FILM CELLS, COLLECTORS-ELECTRODES ASSEMBLIES AND CELLS OBTAINED--

Signed and Sealed this

Twenty-sixth Day of September, 1995

Attest:

BRUCE LEHMAN

*Attesting Officer*     *Commissioner of Patents and Trademarks*